United States Patent [19]

Krüger et al.

[11] Patent Number: 4,480,956

[45] Date of Patent: Nov. 6, 1984

[54] TURBINE ROTOR BLADE FOR A TURBOMACHINE ESPECIALLY A GAS TURBINE ENGINE

[75] Inventors: Wolfgang Krüger, Reichertshausen; Werner Hüther, Karlsfeld, both of Fed. Rep. of Germany

[73] Assignee: Mortoren-und Turbinen-Union, Munich, Fed. Rep. of Germany

[21] Appl. No.: 461,117

[22] Filed: Jan. 26, 1983

[30] Foreign Application Priority Data

Feb. 5, 1982 [DE] Fed. Rep. of Germany ....... 3203869

[51] Int. Cl.³ ................................................ F01D 5/18
[52] U.S. Cl. ............................ 416/97 A; 416/231 R; 416/241 B; 416/132 R; 416/96 A; 415/174; 415/172 A
[58] Field of Search .................... 415/9, 115, 214, 174, 415/172 A; 416/96 A, 97 A, 97 R, 229 A, 241 B, 2, 92, 231, 95, 132 R, 213 R, 214 R, 220, 221

[56] References Cited

U.S. PATENT DOCUMENTS

| | | | |
|---|---|---|---|
| 730,363 | 6/1903 | Geisenhoner | 416/229 A |
| 3,389,889 | 6/1968 | Penny | 416/92 |
| 3,443,792 | 5/1969 | Moss | 416/241 B |
| 3,950,113 | 4/1976 | Albrecht | 416/97 A |
| 4,169,020 | 9/1979 | Stalker et al. | 416/92 |
| 4,285,634 | 8/1981 | Rossmann et al. | 416/97 A |
| 4,390,320 | 6/1983 | Eiswerth | 416/97 R |
| 4,411,597 | 10/1983 | Koffel et al. | 416/97 R |

FOREIGN PATENT DOCUMENTS

| | | | |
|---|---|---|---|
| 57426 | 1/1953 | France | 416/241 B |
| 2463849 | 3/1981 | France | 416/97 R |
| 2027496 | 2/1980 | United Kingdom | 416/96 R |
| 2420575 | 11/1974 | U.S.S.R. | 416/92 |

Primary Examiner—Samuel Scott
Assistant Examiner—Brian J. Bowman
Attorney, Agent, or Firm—Posnack, Roberts, Cohen & Spiecens

[57] ABSTRACT

A high-temperature, extremely high-speed ceramet composite blade comprising a ceramic blade jacket seated from above on a metallic core having a crossweb near its upper end for securing the jacket on the core by one or more metallic retaining pins extending through the crossweb and secured to the core. A head on each bolt is located within a chamber formed above the cross-web and surrounded by the radially projecting end of the blade jacket. A porous abradable coating is secured to the head of the bolt and substantially fills the chamber. The coating projects slightly beyond the end of the blade jacket and is supplied and permeated with cooling air via a cooling duct extending through the retaining pin and metallic core.

15 Claims, 5 Drawing Figures

Fig. 3
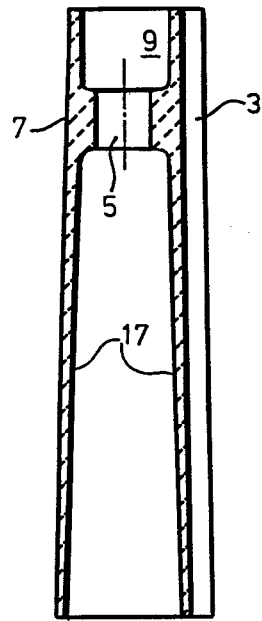
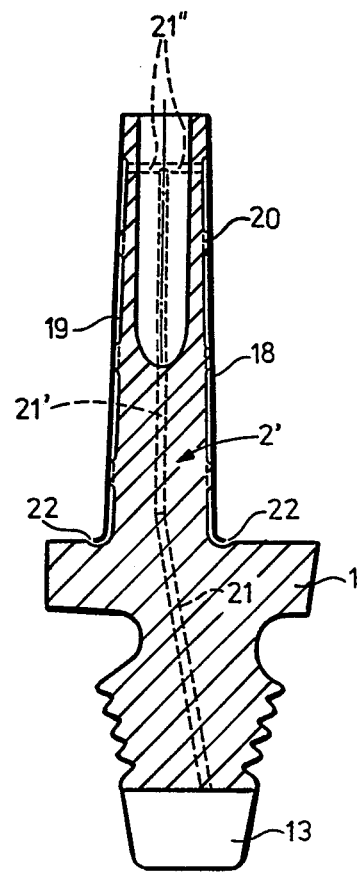
Fig. 5
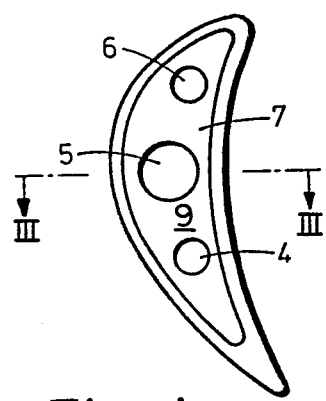
Fig. 4

TURBINE ROTOR BLADE FOR A TURBOMACHINE ESPECIALLY A GAS TURBINE ENGINE

FIELD OF THE INVENTION

The invention relates to a turbine rotor blade for turbomachines, more particularly gas turbine engines comprising a structural metallic core including the blade root and a ceramic blade jacket encasing the core at an airfoil end thereof and flexibly supported on the metallic core.

PRIOR ART

For optimum exploitation of the fuel and in the interest of optimum performance, turbine inlet temperature requirements are continuously being raised for modern gas turbine engines, not only for gas turbine jet engines for aircraft, but also for stationary gas turbine plants. While state-of-the-art cooling means of complex design and manufacture permit operation at turbine inlet temperatures that periodically exceed the melting point of the materials of the turbine blades, this invariably necessitates the use of relatively expensive blade materials and comparatively complex manufacture plus a large demand for cooling air, which on occasion causes turbulence in the respective turbine because relatively great volumes of cooling air carrying a great amount of energy from the blades or the respective blade jackets must be directly returned into the stream of gas.

German Patent specification DE-OS No. 28 34 843 discloses a turbine rotor blade consisting of a structural metallic core including the lower root of the blade in which a ceramic airfoil envelopes the metallic core with a spacing. In this arrangement, the blade core has at its upper end, a head which projects on at least one side and on which the thin-walled ceramic airfoil is supported from below by a protrusion projecting into the interior of the blade.

A disadvantage of this arrangement is the relatively abrupt changes in the cross-section of the ceramic blade jacket and the relatively complex assembly caused by, among others, the construction of the core. Another disadvantage is that in this arrangement, relatively large areas of contact or abutment are produced between the metallic blade core and the ceramic blade jacket which permits a relatively free flow of heat from the jacket to the core in service. Another disadvantage of this known arrangement is that thermally induced movements between the blade jacket and the blade core, especially for frequently alternating thermal loads, cannot be adequately compensated.

U.S. Pat. No. 3,867,068 discloses a pin connection for turbine blades in gas turbine engines to locate a blade insert in the cavity of the blade. This construction, however, does not provide a ceramet composite blade, and the heretofore described disadvantages of such composite blades are neither considered nor are any solutions given.

Also disclosed, in German patent application No. S 92221a/46f, is a turbine blade consisting of an internal steel core and a ceramic blade externally enveloping said steel core. This disclosure, however fails to provide any suitable means of connection for reliably and flexibly locating the ceramic jacket on the metallic core to resist the centrifugal loads prevailing at the relatively high speeds of operation. This disclosure fails to provide any solution to the problem of flexibly locating the ceramic blade jacket in combination with minimized heat transfer surfaces in the mating area between the ceramic blade jacket and the metallic core.

SUMMARY OF THE INVENTION

An object of the present invention is to provide a turbine rotor blade construction which obviates the disadvantages of the conventional turbine blade constructions as heretofore described.

Another object of the invention is to provide a turbine rotor blade construction which is relatively simple to assemble and is relatively simple in design.

A further object of the invention is to provide a turbine rotor blade construction which employs a metallic core and a ceramic blade jacket on the core with means for optimally compensating for differences in thermal loads on the ceramic jacket and the metallic core.

A further object of the invention is to provide a turbine rotor blade construction which has a minimal requirement for cooling air and which provides a connection between the ceramic jacket and the metallic core which will reliably and flexibly sustain high centrifugal loads and permit comparatively simple replacement of the ceramic jacket on the metallic core should the jacket be damaged.

A further object of the invention is to provide a turbine rotor blade construction which eliminates the risk of blade damage as a result of rubbing of the tip or outer end of the blade against the adjoining turbine lining especially at initial running in of the blade.

In accordance with the invention, a turbine rotor blade construction is provided which comprises a metallic structural core on which a ceramic jacket is engaged from above to provide a spacing between the core and jacket, the jacket being releasably and flexibly secured to the core by pin means. A porous abradable coating is secured to the pin means and projects beyond the jacket to form an outer end for the rotor blade and the core and pin means are provided with a duct means for conveying coolant to the abradable coating via the core and the pin means.

In further accordance with the invention, the ceramic jacket is of hollow airfoil shape and is seated on the metallic core and secured thereto by the pin means which comprises one or more metallic retaining pins. Heat insulating means are provided between the mating ceramic and metallic surfaces to reduce the flow of heat from the ceramic jacket to the cold structural components of the core.

As a consequence of the construction of the rotor blade according to the invention, the metallic parts of the composite blade are not wetted by the stream of hot gases but are thermally stressed only by the radiation and conduction of heat from the ceramic airfoil jacket. Thereby the amount of cooling air needed is rather minimal, when compared to that for conventional high temperature rotor blades. Accordingly, the hollow shape of the ceramic blade jacket requires no separate cooling provisions and the surface temperature limit can thus be taken at about 2000° K.

According to a feature of the invention, a thin metal jacket is mounted on the outer surface of the metallic core to provide a highly efficient cooling configuration on said core. In this regard, air is forced to circulate between the metallic jacket and the core to prevent the metal parts from overheating. The surface of the metal jacket facing the ceramic jacket which is mounted thereon can be provided with a reflective layer to reflect heat radiation and prevent transmission to the metallic core.

In order to protect the ceramic airfoil jacket from damage should the composite rotor blade of the invention rub against the turbine stator, the porous abradable coating which projects beyond the jacket to form the outer end for the rotor blade will partially be worn away when the turbine rotor blade tip rubs against the stator lining. The porous abradable coating is secured to the pin means by brazing or by a suitable difusion process. The porous abradable coating is protected against overheating by permeation of the coating with cooling air from said duct means after the cooling air has first cooled the metal core and the pin means.

If a repair is necessary, the ceramic jacket which is exposed to the action of the hot gases can readily be replaced by removing the retaining pin means. The duct means for cooling the blade is not formed in the ceramic jacket and hence no special provisions are necessary in its replacement. The pin means can be composed of one or more retaining pins secured to the metallic blade core in a manner which will permit seperation such as, for example, by brazing, by a diffusion joining process or by a threaded connection.

In accordance with a further feature of the invention, the retaining pin means comprises one or more retaining pins each having a head received in a recess or chamber located above a cross-web in the ceramic jacket. In this way, the external contour of the turbine blade is formed exclusively by the ceramic jacket which is continuous and uninterrupted. The abradable coating substantially fills the remainder of the recess or chamber and is secured to the head of each retaining pin.

In further accordance with the invention, the outer surface of the core is cooled by passing cooling air on said outer surface. Preferably, the cooling air is passed on the outer surface of the core from the outer end thereof towards the root section thereof and the cooling air is discharged into the ambient atmosphere proximate the root section.

Further objects, features, and advantages of the invention will become apparent from a detailed consideration of specific embodiments of the invention which will be described hereafter with reference to the appended drawing.

BRIEF DESCRIPTION OF THE VIEWS OF THE DRAWING

FIG. 3 is a sectional view through the ceramic blade jacket taken along line III—III in FIG. 4.

FIG. 4 is a plan view of the ceramic blade jacket in FIG. 3.

FIG. 5 is a sectional view of a modified blade without the blade jacket of FIG. 3.

DETAILED DESCRIPTION

Figures 1, 2:
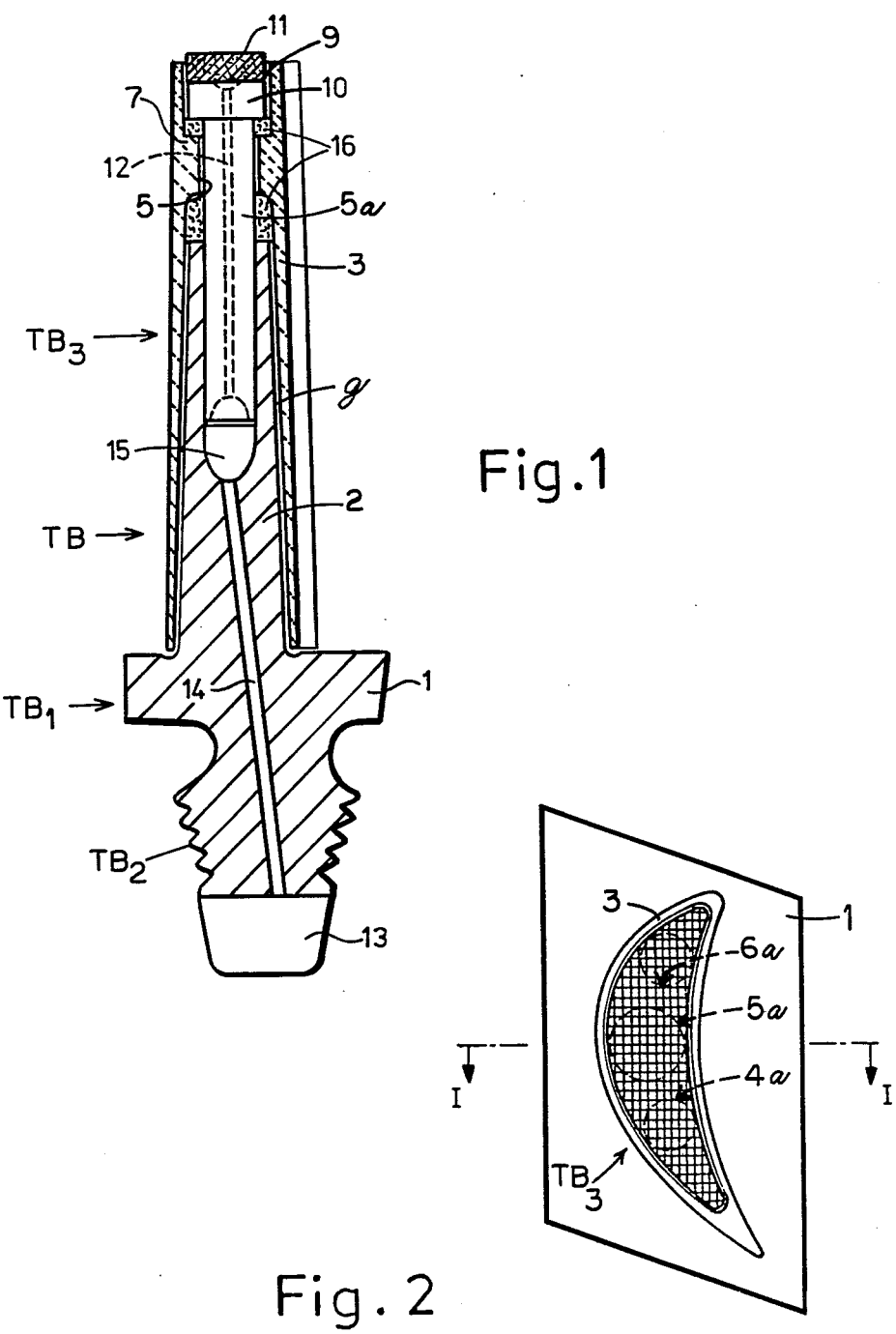
FIG. 1 is a radial sectional view through a turbine blade according to the invention taken along line I—I in FIG. 2.
FIG. 2 is a plan view of the blade in FIG. 1.

Referring to the drawing, therein is seen a turbine rotor blade TB adapted for use, for example, in a gas turbine engine. The rotor blade TB includes a root section $TB_1$ having a threaded portion $TB_2$ by which the rotor blade is adapted for being secured to a support (not shown). Projecting from the root section $TB_1$ is a blade portion $TB_3$ of an airfoil section as evident from FIG. 2. The root section $TB_1$ includes a base or pedestal 1 from which projects an integral metallic core 2. A blade jacket 3 of ceramic composition is seated on the core from above such that a clearance space or gap g is formed between the core 2 and the ceramic jacket 3.

In the region of the upper end of the jacket 3, a crossweb 7 is formed with a plurality of holes 4, 5 and 6. Each hole accommodates a respective retaining pin 4a, 5a, 6a with clearance, the pins collectively securing the jacket 3 on the core 2. Each pin is secured to the core 2 in a manner such that by removing the pins from the core, the jacket is removable from the core. The pins can be secured to the core, by threaded connection, brazing or by diffusion.

Each pin includes a respective head 10 at its upper end which is seated in an open recess or chamber 9 located in the jacket 3 above the crossweb 7. A body 11 of porous, abradable, material is affixed to the upper surfaces of the heads 10 of the pins 4a, 5a, 6a and fills the chamber 9 as evident from FIGS. 1 and 2. The body 11 which serves as a coating on the upper surfaces of the heads 10 projects slightly radially outwards of the outer end of the jacket 3 to form an outer, abradable end for the rotor blade TB. The porous, abradable body 11 is made, for example, of metal powder or felt and is attached to the bolt heads, for example, by brazing or a diffusion process.

The porous body 11 is furnished with a coolant such as cooling air via a duct system extending through the pins 4a, 5a, 6a and the core 2 and communicating with an air supply (not shown) at the root section of the blade. Each pin has a central bore 12 extending axially therethrough which communicates at its upper end with the porous body 11. Cooling air is supplied from the air supply to a cavity 13 at the bottom of the root section of the blade and the air flows from cavity 13 through a duct 14 in the core 2 into a blind bore 15 in which a respective pin is received, the air flowing from the blind hole 15 into the bore 12 of the respective pin and therefrom into the porous body 11 to diffuse therein. Instead of conveying the air from duct 14 into a respective bore 15, a common manifold could be provided communicating with the bores 12 in the three pins.

A layer of thermal insulation 16 or a shaped thermally insulated body is provided between each of the bolt heads and the crossweb of the jacket and between the crossweb and the upper end of the core 2. In this way, there is thermal insulation between the ceramic blade jacket and the metallic blade core and metallic pins. The thermal insulation 16 can be aluminum titanate or zirconium oxide.

The attachment of the ceramic jacket 3 to the core 2 is made without direct contact of the jacket with the core and with the retaining pins. Thereby, the jacket has a limited flexibility in its mounting on the core. Moreover, the absence of direct contact serves as a means to inhibit heat transfer between the jacket and core.

Referring next to FIG. 5 which shows a modified embodiment of the blade with the jacket omitted, similar reference characters will be used to designate the same or modified structure.

In FIG. 5, the greater part of the core 2' of the airfoil section is surrounded by a thin metal jacket 18 shaped in correspondence with the inner surface 17 (FIG. 3) of the ceramic blade jacket 3 to form a gap therewith when the jacket 3 is seated on the core 2'. The metal jacket 18 forms a duct system 19 between itself and the blade core 2' in the airfoil section for conveying cooling air, the configuration of the duct system being governed by the external contour of the metal core 2' to achieve highly efficient cooling. The duct system 19 is formed by means of pads 20 on core 2' serving as abutment surfaces between the jacket 18 and the core 2'.

The outer surface of the metal jacket facing the ceramic jacket can be provided with a reflective layer to reflect radiation and inhibit heat transfer from the jacket to the core.

The cooling duct system 19 on the blade core 2' enclosed by the metal jacket is supplied with cooling air from the root end of the blade. In this arrangement, the cooling air is first ducted from the cavity 13 adjoining the bottom land of the blade slot towards the upper end of the core through a radial duct 21 and one or more ducts 21'.communicating with the radial duct 21 and extending through the blade core 2'. At the upper end of the core, the cooling air is ducted to the cooling duct system 19 through a lateral duct 21". The duct system 19 has a discharge outlet 22 for discharging cooling air into the turbine duct at a location proximate the blade pedestal 1.

The ceramic blade jacket 3 illustrated in FIG. 3 is readily removable and replaceable on the core by reason of the pin connection and the crossweb on the jacket.

Where not previously indicated the preferred materials for essential components include:
for the metallic blade core 2 and 2': Inconel 100,
for the ceramic blade jacket: sintered silicon carbide or sintered silicon nitride,
for the metallic retaining pins 4a, 5a, 6a: Inconel 100,
for the cooling air jacket 18: Inconel 625

The present invention is suitable for all types of turbomachine turbines energized with high-temperature gas, such as stationary gas turbine engines and turbojet engines for aircraft.

The inventive concept readily embraces arrangements other than the embodiments shown, as for example, in which only a single metallic retaining pin is used to attach the ceramic blade jacket to the metallic blade core.

The inventive concept is deemed to include all embodiments falling within the terms of the appended claims.

What is claimed is:

1. A turbine rotor blade comprising a metallic, structural core, a ceramic jacket surrounding said core with spacing therebetween, said jacket being engaged on said core from above, pin means engaging said jacket and core for releasably securing said jacket on said core, a porous abradable coating on said pin means projecting beyond said jacket to form an outer end for the rotor blade, duct means in said core and said pin means for conveying coolant to said abradable coating via said core and said pin means, said jacket including an outer end portion extending beyond said core, said coating projecting beyond said outer end portion of the jacket, a crossweb defining a recess above said crossweb, said pin means passing with clearance through said crossweb and including end means comprising a head in said recess, said coating being on said head, separable means connecting said pin means to said core, said head of said pin means holding said jacket on said core such that separation of said pin means and core enables said jacket to be removed from said core, thermal insulation means between said jacket and said core and pin means, and a metal jacket interposed between said ceramic jacket and said core, said metal jacket having an outer surface conforming to the inner surface of said ceramic jacket and an inner surface forming a second duct means with said core for passage of coolant to cool said core.

2. A rotor blade as claimed in claim 1 wherein said coating is made of metal powder or felt and is secured to said head by brazing or diffusion.

3. A rotor blade as claimed in claim 1 wherein said separable means is selected from the group consisting of a brazed, diffusion or threaded connection.

4. A rotor blade as claimed in claim 1 comprising a layer on said metal jacket facing said ceramic jacket for reflecting heat radiation.

5. A rotor blade as claimed in claim 1 comprising a third duct means in said core communicating with said second duct means for supplying said coolant to said second duct means.

6. A rotor blade as claimed in claim 5 wherein said core includes a root section adapted for being secured in a support, said second duct means having an open outlet end for discharge of coolant therefrom in proximity to said root section.

7. A rotor blade as claimed in claim 6 wherein said third duct means includes a first branch which extends longitudinally in said core and a second branch extending laterally from said first branch into communication with said second duct means.

8. A rotor blade as claimed in claim 1 wherein said duct means extends axially in said pin means.

9. A rotor blade as claimed in claim 1 comprising means for supplying coolant to the outer surface of said core for cooling said core.

10. A rotor blade as claimed in claim 1 wherein said pin means comprises a plurality of pins, each having a respective duct means therein.

11. A turbine rotor blade comprising a metallic, structural core, a ceramic jacket surrounding said core with spacing therebetween, said jacket being engaged on said core with spacing therebetween, said jacket being engaged on said core from above, pin means engaging said jacket and core for releasably securing said jacket on said core, a porous abradable coating on said pin means projecting beyond said jacket to form an outer end for the rotor blade, duct means in said core and said pin means for conveying coolant to said abradable coating via said core and said pin means and a metal jacket interposed between said ceramic jacket and said core, said metal jacket having an outer surface conforming to the inner surface of said ceramic jacket and an inner surface forming a second duct means with said core for passage of coolant to cool said core.

12. A rotor blade as claimed in claim 11 comprising a layer on said metal jacket facing said ceramic jacket for reflecting heat radiation.

13. A rotor blade as claimed in claim 11 comprising a third duct means in said core communicating with said second duct means for supplying said coolant to said second duct means.

14. A rotor blade as claimed in claim 13 wherein said core includes a root section adapted for being secured in a support, said second duct means having an open outlet end for discharge of coolant therefrom in proximity to said root section.

15. A rotor blade as claimed in claim 14 wherein said third duct means includes a first branch which extends longitudinally in said core and a second branch extending laterally from said first branch into communication with said second duct means.

* * * * *